United States Patent [19]

Leone et al.

[11] 4,137,509
[45] Jan. 30, 1979

[54] TUNABLE LASER BASED UPON $S_2$, $Te_2$ AND OTHER SELECTED DIMERS

[75] Inventors: Stephen R. Leone, Boulder, Colo.; Kenneth G. Kosnik, Burbank, Calif.

[73] Assignee: The United States of America as represented by the Secretary of the Navy, Washington, D.C.

[21] Appl. No.: 793,214

[22] Filed: May 2, 1977

[51] Int. Cl.² .......................................... H01S 3/223
[52] U.S. Cl. ........................ 331/94.5 G; 331/94.5 C
[58] Field of Search ................... 331/94.5 G, 94.5 C, 331/94.5 M

[56] References Cited
PUBLICATIONS

Leone et al., Applied Physics Letters, vol. 30, No. 7, Apr. 1, 1977, pp. 346-348.

Silfvast et al., Applied Physics Letters, vol. 20, No. 12, Jun. 15, 1972, pp. 501-504.

*Primary Examiner*—William L. Sikes
*Attorney, Agent, or Firm*—Richard S. Sciascia; Paul N. Critchlow

[57] ABSTRACT

Lasing can be achieved by pumping a laser cell containing a vapor formed predominantly of Group VI dimers such as $S_2$, $Te_2$, $Se_2$, TeO, TeSe, TeS and SeS, from a ground electronic state to a selected vibrational-rotational level in a selected excited electronic state. The selected excited electronic state is one having allowed transitions relative to the ground electronic state and the selected level of the excited state is one that is below the dissociation limit of that state. Lasing transitions then occur between the selected excited state level and higher vibrational-rotational levels of the ground state. For example, lasing is achieved at $S_2$ (B-X) and at $Te_2$ (A-X).

7 Claims, 3 Drawing Figures

TUNABLE LASER BASED UPON S₂, TE₂ AND OTHER SELECTED DIMERS

BACKGROUND OF THE INVENTION

The present invention relates to lasers and, in particular to tunable lasers using a gas or vapor emitter.

Although the scope of the present invention applies generally to the lasing of various dimers of the Group VI elements of the Periodic Table, the experimentation and study on which the invention is based have been directed primarily toward the $S_2$ dimer. For the most part the following discussion will be with reference to this $S_2$ study and its results. Applicability to other Group VI dimers subsequently will be discussed. Also, it should be noted that the term 'dimer' as presently used, is intended to broadly refer to molecules formed by the union of two simpler molecules. In this sense, it can be considered as including the union of identical molecules such as $S_2$ and $Te_2$ as well as the union of non-identical molecules such as TeSe, TeS etc. The term 'dimer' thus embraces the more general term 'diatomic' which generally applies to heteronuclear molecules.

As has been reported by A. Fowler and W. M. Vaidya, Proc. Royal Soc. A 132, 310 (1931) and G. Lakshminarayana and C. G. Mahajan, J. Quant. Spectrosc. and Radiat. Transfer 16 549 (1976), emission from $S_2$ (B-X) is widely observed in flames, shock tubes and discharges whenever compounds of sulfur are present. Also, V. S. Zuev, L. D. Mikheev and V. I. Yalovoi, Sov. J. Quant. Electron. 5, 442 (1975) reports an $S_2$ infra-red laser on $^1\Sigma_g^+ - {^3\Sigma_g^-}$ transition at 1.1 mm. The present invention, however, appears to be the first demonstration of lasing based on Group VI dimers including $S_2$, at allowed transitions from certain excited electronic states to the higher vibrational levels of the ground electronic state. For purposes of this invention a so-called allowed transition is a transition between singlet-singlet, doublet-doublet, triplet-triplet, etc. The infra-red laser of Zuev, et al. is on a relatively weak non-allowed singlet-triplet transition.

Objects of the invention are to provide a tunable laser which is highly efficient, scalable, relatively nondegradable and which offers strong promise for successful pumping by a variety of direct pumping schemes including chemical and electrical pumping.

BRIEF DESCRIPTION OF THE DRAWINGS

The invention is illustrated in the accompanying drawings of which.

DETAILED DESCRIPTION OF THE INVENTION

Figure 1:
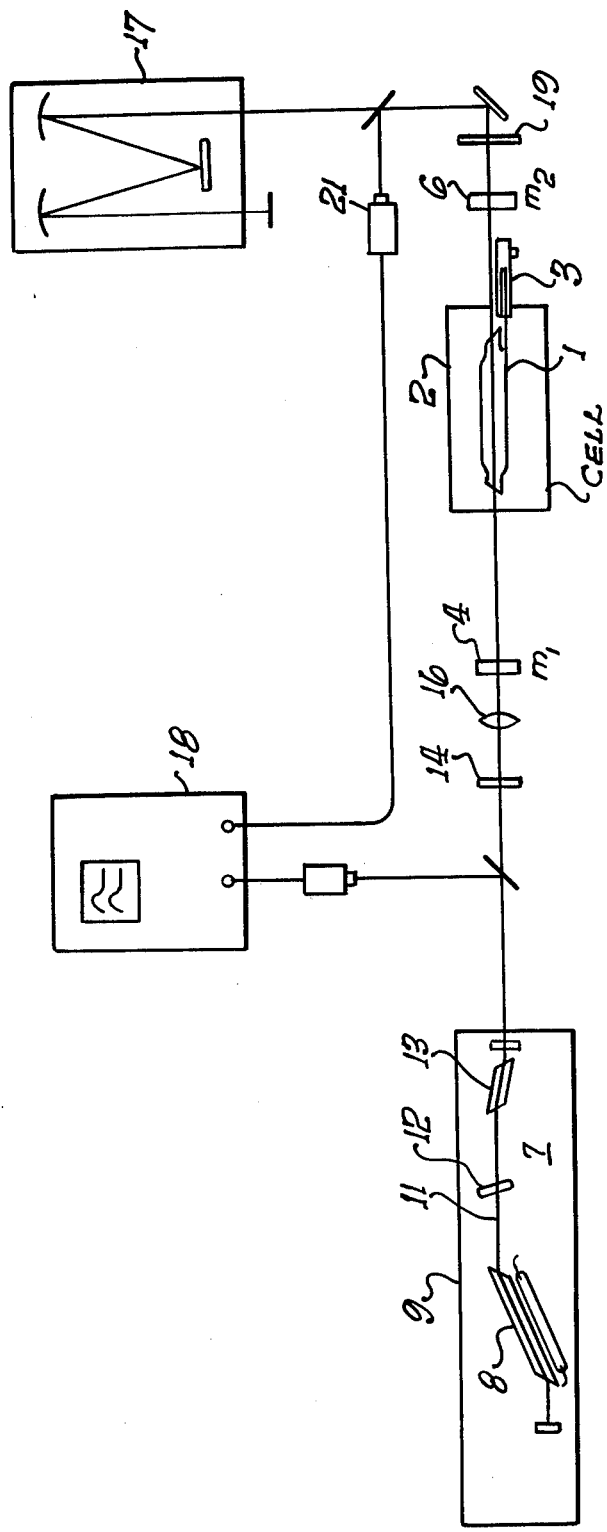
FIG. 1 schematically illustrates the present laser and a test set-up used in observing its lasing characteristics.

In FIG. 1, an $S_2$ laser cell, identified by numeral 1, is, as used in an experiment set-up, a 12 cm long Brewster angle, all-fused quartz cell mounted in an oven 2 which, for purposes to be discussed, is provided with a pressure-controlling sidearm 3. The temperatures of both the oven and the sidearm are controllable within desired limits to maintain the cavity of the cell at an optimum temperature and pressure. Laser mirrors or reflectors 4 and 6 are employed for conventional purposes to control the reflectivity characteristics of the cell.

To provide a working cell, a few milligrams of sulfur are placed in the cell cavity and the cell then evacuated, sealed off and mounted in an oven which is used to vaporize the sulfur and produce a low vapor pressure. Both the temperature and the pressure are controllable to assure the break-down of the large ring molecules of the sulfur and, particularly to assure the formation within the cavity of sulfur molecules which are predominantly sulfur dimers ($S_2$). For example, it is known that at a temperature of 600° C. and a pressure of 1 torr, the molecular population in the cavity is about 99% $S_2$ with the remaining percentage representing other sulfur polymers. However, lower temperatures can be used. Thus, a temperature of 400° C. results in about a 90% formation of $S_2$. Optimum pressure also is significant and is achieved by employing sidearm 3 maintained at about 180°-240° C. Such sidearm arrangements are well-known devices for controllably varying cavity pressures. They function by promoting or reducing vaporization in their cooler environment. The obvious objective of the temperature and pressure controls is to assure formation of a predominant amount of a sulfur dimer within the cell cavity. However, these effects have been studied and are available in reported literature such, for example, as the study of B. Meyer, *Elemental Sulfur* (Interscience, New York, 1965).

One finding of the present invention is that lasing can be achieved on the $S_2$ molecular system on its B-X transition. The lasing characteristics are apparent in FIG. 2 which subsequently will be considered. To achieve the B-X lasing it, of course, is necessary to pump or excite the $S_2$ molecules from their ground state (X) to their excited state (B). Present pumping has been accomplished optically by the use of a nitrogen laser pump and, more recently, by the use of a frequently-doubled, dye laser. The first experiments used a nitrogen laser pump (1-10 mJ per pulse, 10 nsec) focused through a partially-transmitting input mirror longitudinally into an $S_2$ cell with mirrors of, typically, 99% R and 50% R over the visible and ultraviolet range desired. The particular nitrogen laser (337.1 nm) overlaps with the (2,4) band of $S_2$. At a pressure of about 10 torr, bright spontaneous fluorescence from the side of the cell was visible, even with the room lights on. Stimulated emission first was observed in the blue region of the spectrum.

Other more refined studies employed a frequency-doubled dye laser known in the art as a Chromatix laser, which is available commercially and fully described in published literature. As shown, it includes a dye cell 8 pumped by a tunable flash lamp 9 to emit a laser beam 11 passed through an etalon 12, a frequency doubler 13, a filter 14 and a lens 16 longitudinally into the $S_2$ cell. The use of this laser permits the tuning of the $S_2$ laser over a variety of bands absorbing from 290 nm up to 305 nm with the bands being excited from a (3,0) to (7,0) according to tables of B. Rosen, *Selected Constants-Spectroscopic Data Relative to Diatomic Molecules,* (Pergammon Press, Oxford, 1970). The dye laser has characteristic pulse energies in the ultraviolet of 0.5 mJ, 0.5 cm$^{-1}$ bandwidth using a low finesse (R30%) etalon and a 2 microsecond duration. The peak power with the dye laser is considerably lower than that of the nitrogen pump. Most stable lasing is achieved when the dye laser is focused to a beam radius of a hundred microns in a few torr of $S_2$.

The experimental set-up also included a monochromator 17 and an oscilloscope 18. The monochromator optically provides wave-length data which can be photographed while the oscilloscope provides a time-dependent validation of the $S_2$ beam. As shown, the $S_2$ beam is passed through a filter 19 and photodiodes 21 for display by the oscilloscope. Simultaneously, the output of dye laser 7 also is by-passed into the oscilloscope. Due to the time-dependence, the displays are spaced and the validity of tests is assured by the ability of the $S_2$ pattern to faithfully replicate the dye laser pattern.

Figure 2:
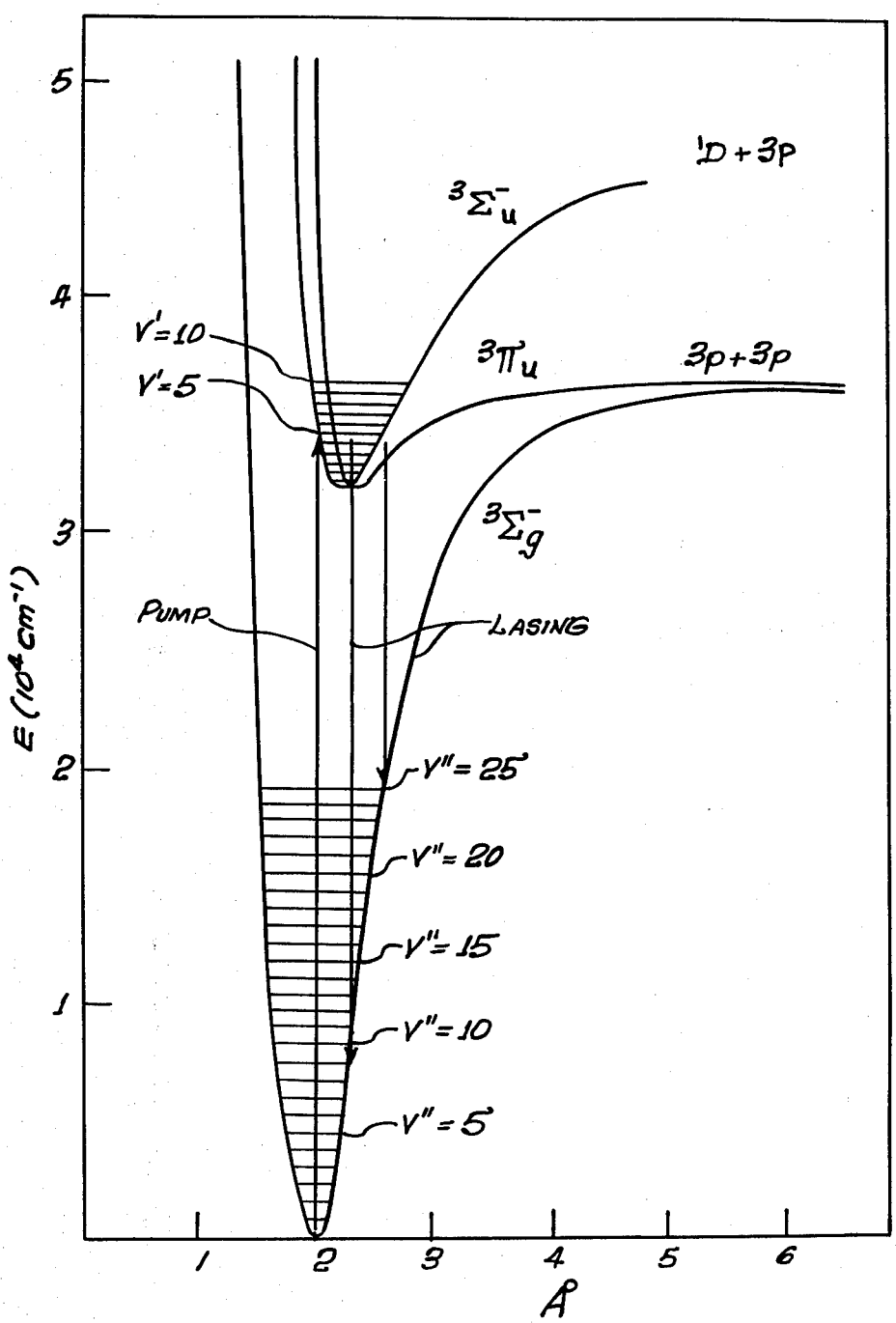
FIG. 2 is a plot showing the approximate potential surfaces for $S_2$ molecules used in one form of the invention.

FIG. 2 shows the approximate potential surfaces for the known $S_2$ molecular states as provided in an unpublished paper of J. M. Ketteringham, "The Electronic Spectra of Simple Molecules", Ph.D. Thesis, University of Oxford, 1964. According to conventional practices, the surfaces are plotted in angstrom separation versus energy in wave numbers, $E(10^4 cm^{-1})$. The angstrom separation represents the vibrational characteristics of the atoms of the $S_2$ dimer at various levels of both the excited (V') state and the ground state (V"). Levels V' $\leq$ 9 are bound although often perturbed and they are characteristic strong emitters. V' levels $\geq$ 10 were not observed in emission probably due to strong predissociation.

In FIG. 2, one excitation line and the maximum and minimum observed lasing wavelengths are shown for V' = 5. Lasing transitions also can be observed to almost all V' levels in between whenever the well-known Franck-Condon factors are not nearly 0. Several qualitative features of the FIG. 2 potential surfaces are quite significant. First, all of the lasing states explored, including the V' = 2, 3, 4, 5, 6, 7, are well below the dissociation limit of the $S_2$ molecule. Thus, as stated, the lowest vibrational levels of the V' state although perturbed, are not predissociated. Also, the potential surfaces are fortuitously situated so that any small population in V' $\geq$ 0 of the $B^3\Sigma_u^-$ excited state is inverted with respect to the high vibration levels of the ground $X^3\Sigma_g^-$ state. The fortuitous nature of the potential surfaces is apparent in FIG. 2. First, as can be noted, the V" curve is quite steep. Also, because of the relative positions of the V' and the V" levels, lasings transitions from the bound levels of V' terminate at the higher vibrational levels of the ground state (V"). Even so, a relatively small population in V' $\geq$ 0 of the excited state is inverted with respect to these higher vibrational levels of the ground state. Population inversion is not only operatively demonstrable but, as desired, can rather easily be calculated in manners known to the art.

The Franck-Condon factors for these B-X transitions are as large as 0.1 for many bands and cover broad spectral ranges before diminishing. The measured fluorescence lifetimes of individual states is approximately 20 nsec, giving $A_{v'}{}^{v''} r^{J''}$ coefficients for single lines on the order of $10^5$ to $10^6$ sec$^{-1}$. Thus, as found in the present experiments, high gain laser action from a single rotational level in V" = 5 can be observed on numerous lines over a 365 nm to 530 nm range. Wavelength regions, which are missed when the Franck-Condon factors drop to zero at the nodes of one upper state vibrational wave function, are conveniently covered by the next higher and lower vibrational levels. Taking into account that successive vibrational bands nearly overlap, also the availability of numerous sulfur isotopes, almost complete coverage of the ultraviolet and visible regions of the spectrum is possible.

All bands that were pumped by the doubled dye laser exhibited strong lasing action throughout the visible. The lasing wavelengths were primarily in the violet, blue, blue-green and green regions, centered about the reflectivity maximum of the mirrors, 450–550 nm. The strongest observed laser lines correspond well with the wavelengths of emission bands recorded in the previously-cited Rosen reference for each $S_2$ band pumped. Sharp P and R branch doublets are observed for each lasing transition. For a single pump wavelength, as many as 8–10 doublets, spaced by the vibrational levels in the ground state, lase simultaneously in the broad band cavity. Lasing is observed both with and without narrowing of the pump bandwidth. More powerful and stable operation can be achieved with modest narrowing to 0.5 cm$^{-1}$. Experimentally the pump energy needed for threshold in the $S_2$ laser with the 50% output coupler is 100mJ. The pump band, however, is ten times broader than individual $S_2$ lines and much of the pump light is not used to produce the lasing state. Gain is observed to be superfluorescent on the strongest lines at higher $S_2$ pressures. Transitions, as short in wavelength as 400 nm and as long as 570 nm, have been observed to lase where both mirrors had a reflectivity of only 50%. A cavity composed of R = 99% at 360–410 nm and R = 40% at 350–400 nm mirrors is found to sustain stable and strong lasing at wavelengths observed from 365–390 nm. In this set-up the strongest visible lines are not completely suppressed. Energy conversion has been measured for the total visible output of the $S_2$ laser and found to be 2%.

Each $S_2$ band is 15–25 Å wide in absorption and tuning has been accomplished over entire bands. Typically, there are strong $S_2$ absorption lines every few cm$^{-1}$ in a single vibrational band. However, there are numerous rotational satellites and overlapping bands. In practice, 3–4 lasing absorptions are observed per cm$^{-1}$. In regions of the band heads, the spectrum is even more dense. The pump laser can be tuned over numerous lines in the (5,0) band, and the lasing output tuned correspondingly within the (5,21) band as observed in the monochromator.

From a number of considerations, the present optically pumped $S_2$ laser is not fully optimized. As mentioned, the pump wavelength mode matching is a factor of ten times broader than the $S_2$ lines. Proper mode matching of the focused pump beam to the $S_2$ laser cavity has not been attempted. The present conditions utilize 3m radius of curvature mirrors, which sustain a beam area inside the cavity an order of magnitude larger than the pump zone. Bright spontaneous emission is observed from the side of the $S_2$ cell because of the short radiative life time. Even when the best lasing is obtained, this emission is not dramatically reduced in intensity. Improved mode matching should greatly enhance the output.

Also, in these experiments, the laser length was restricted to the particular 12 cm cell and laser operation was observed to fall off abruptly with increased pressure. Most likely $S_2$–$S_2$ collisions quenched the $B^3\Sigma_u^-$ state. Operation with a longer path length and lower total $S_2$ pressure should greatly improve conversion efficiency. Since only lasing transitions which originate from a single excited state were observed, most likely any molecules which are relaxed result in excitation which is lost from the system for laser output. Some selective relaxation by addition of other molecules or rare gases can enhance the efficiency or tuning range without quenching. In addition, single laser lines can be tuned with conventional dispersive elements in the $S_2$ laser cavity.

The sulfur laser compares very favorably to the other optically pumped molecular dimer systems $I_2$, $Na_2$, and $Br_2$. With fully optimized parameters, conversion efficiencies should far exceed the 2% measured here. It is likely that other pump sources such as an XeF laser or single-line, high-power arc lamps can excite the $S_2$ molecule. Since strong $S_2\ {}^3\Sigma_u^-$ emission has been observed under numerous other conditions, chemical or electrical pumping schemes are contemplated. The ease with which the sulfur dimer appears to be formed in the appropriate excited state clearly demonstrates the fact that the $S_2$ laser provides an efficient and tunable visible and ultraviolet laser source.

As earlier stated, lasing action also can be achieved for other dimers of Group VI of the Periodic Table. For example, tests have demonstrated lasing of a $Te_2$ cell pumped from its ground electronic state to excited electronic state A. The lasing therefore is at A–X transitions. Based upon the clear evidence provided by the $S_2$ and $Te_2$ tests and upon spectroscopic analyses that have been made, the lasing of various Group VI dimers is apparent. In particular, the group consists of $Se_2$, TeO, SO, TeSe, TeS and SeS in addition to $S_2$ and $Te_2$.

The lasing transitions in all of the cells are allowed transitions between an excited electronic state to which the cell is pumped and its ground electronic state. More specifically, the cells are pumped from ground to a selected vibrational-rotational level of a particular excited electronic state which is an allowed state relative to the ground electronic state. In other words, if, as in the $S_2$ cell the ground state is a triplet, the selected excited state to which the cell is pumped will be a triplet state. Transitions then occur between the selected excited state level and higher vibrational-rotational levels of the ground state. These transitions are so-called allowed transitions defined for the present as being transitions between triplet-triplet, doublet-doublet, etc. as contrasted with non-allowed transitions such as a singlet-doublet or doublet-triplet.

Another important factor is that the vibrational-rotational level of the selected excited electronic state should be one that is below the dissociation limit of the excited electronic state. The various dimers which have been identified have excited electronic state levels which are allowed and which also, exhibit the rather deep curve shown in FIG. 2 for the excited B state of $S_2$. Their dissociation limits either are known or can rather easily be spectroscopically determined.

Other factors which either are known in the literature or are available spectroscopically include the essential fact that other Group VI dimers have excited electronic states and ground states similar functionally to those shown in FIG. 2 for $S_2$. Specifically, the potential surface plots for these other dimers exhibit lasing transitions similar to the FIG. 2 surfaces. Thus, the excited electronic states are shifted in the manner discussed with respect to FIG. 2 and the ground electronic states exhibit relatively steep curves which permit transitions from an excited state level to higher vibrational-rotational levels of the ground states. Generally, studies which have been made demonstrate that the conditions resulting in the lasing action of $S_2$ and $Te_2$ apply equally to the other dimers. Further, the Franck-Condon factors again are favorable.

In the tests conducted on the $Te_2$ cell, the experimental set-up was essentially the same as that shown in FIG. 1 for the $S_2$ cell. Thus, the tellurium is deposited in an evacuated cell which then is heated in a controlled manner to produce predominantly the tellurium dimer. A temperature of about 700° C. and a pressure of about 1 torr was found most suitable. Pressure again is controlled by the sidearm technique with a sidearm temperature of about 500° C. Pumping was accomplished by the use of the visible output of the dye laser of FIG. 1. Pumping was from ground electronic state to the A state. Thus, laser action is on an A–X transition. As already indicated, the lasing on other transitions is clearly apparent providing the transitions are a quantum-mechanically allowed transition such as A–X.

Summarizing, the present invention provides a related series of molecular systems for use as lasers. The series includes those dimers of Group VI of the Periodic Table which have been identified. The availability of the series is especially advantageous in that it materially extends the range of tunable wavelengths. In particular, the $S_2$ (B–X) cell is in the desirable blue-green wavelength regions of visible and ultraviolet lasers. Also, the $S_2$ molecule demonstrably has high gain and extremely good prospects for high efficiency. The ease with which these dimers appear to be formed further provides a strong indication that a working laser using chemical or electrical pumping is a definite possibility. One further advantage is that these lasers are of a type using a vapor or gas rather than a liquid. As is known, the gas lasers have much better refraction characteristics than the liquids.

Obviously many modifications and variations of the present invention are possible in the light of the above teachings. It is therefore to be understood that within the scope of the appended claims the invention may be practiced otherwise than as specifically described.

We claim:

1. A tunable laser based upon selected Group VI dimers comprising:
    an optically resonant cavity,
    a laser cell disposed in said cavity, said cell containing predominantly a vapor selected from a group of dimers consisting of $S_2$, $Te_2$, $Se_2$, TeO, TeSe, SO, TeS and SeS,
    means for pumping said vapor from a ground state to a selected vibrational-rotational level in a selected excited electronic state below the known dissociation level of said excited state, said selected excited state being one having allowed transitions relative to said ground electronic state, whereupon a lasing output is produced at allowed transitions between said excited state level and the higher vibrational-rotational levels of said ground electronic state, and
    means for tuning said lasing output.

2. The laser of claim 1 wherein said group of dimers consists of $S_2$ and $Te_2$.

3. A visible and ultraviolet tunable laser on $S_2$(B–X) comprising:
    an optically resonant cavity,
    a laser cell disposed in said cavity, said cell containing predominantly an $S_2$ vapor,
    means for pumping said vapor from ground state $X^3\Sigma_g^-$ to a selected vibrational-rotational level of excited electronic state $B^3\Sigma_u^-$ below the known dissociation limit of said excited state, whereupon a lasing output is produced between said selected excited state level and higher vibrational-rotational levels of said ground electronic state, and means for tuning said lasing output.

4. The $S_2$ laser of claim 3 further including:

cell heating means for establishing a cavity temperature and vapor pressure favoring the formation of the $S_2$ vapor relative to other sulfur polymers.

5. The $S_2$ laser of claim 4 wherein said heating means maintains a vapor temperature in said cell of at least 400° C. and a vapor pressure of between 1–10 torr.

6. The $S_2$ laser of claim 5 wherein said heating means maintains a temperature of about 600° C. and a pressure of 1 torr.

7. The $S_2$ laser of claim 3 wherein said pumping means is a tunable dye laser.

* * * * *